June 14, 1960     L. J. RAMPEL     2,940,380
ROTARY BROILER
Filed Jan. 22, 1959     3 Sheets-Sheet 1
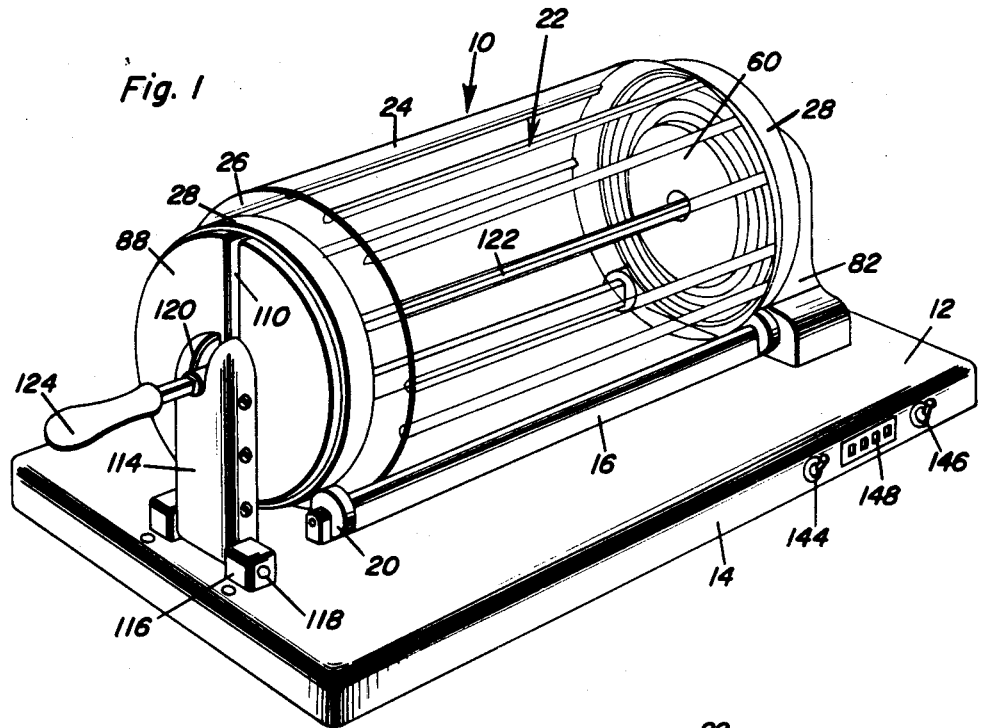
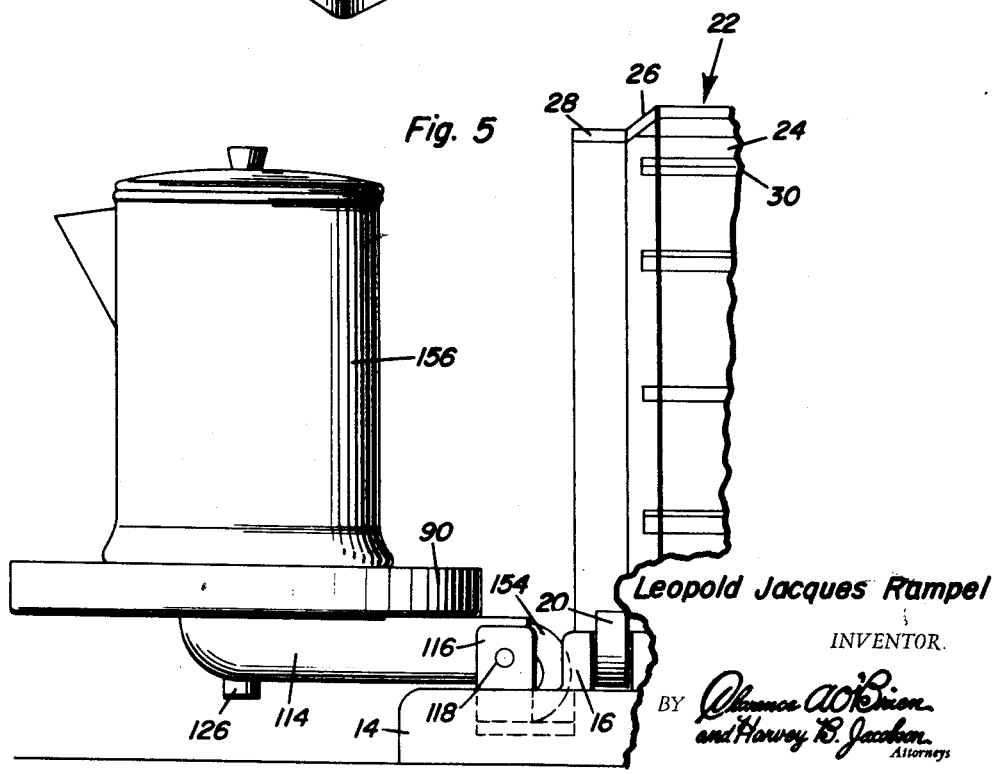
Leopold Jacques Rampel
INVENTOR.

June 14, 1960   L. J. RAMPEL   2,940,380
ROTARY BROILER
Filed Jan. 22, 1959   3 Sheets-Sheet 2
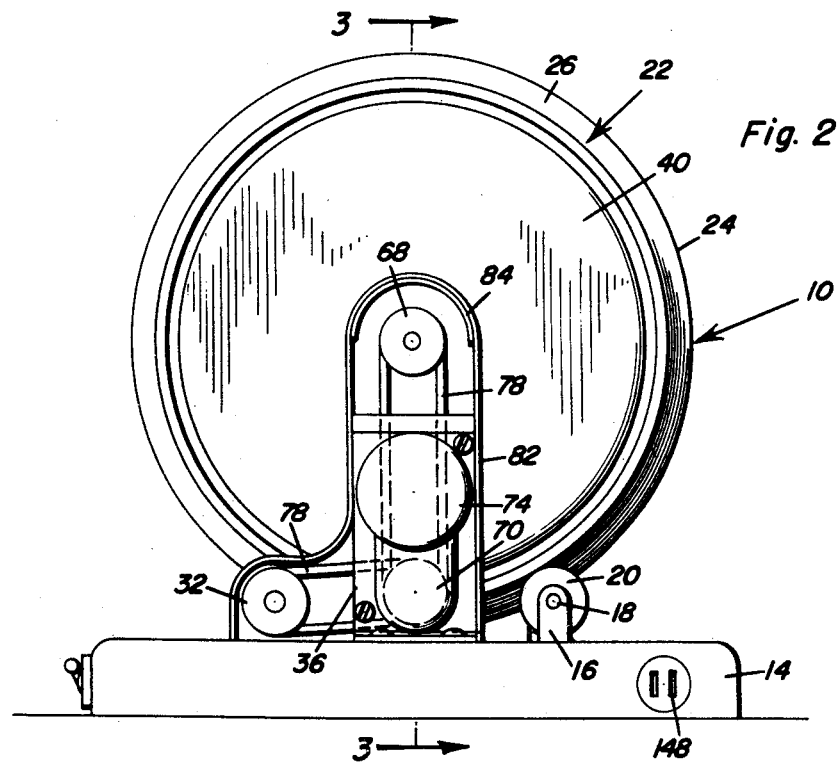
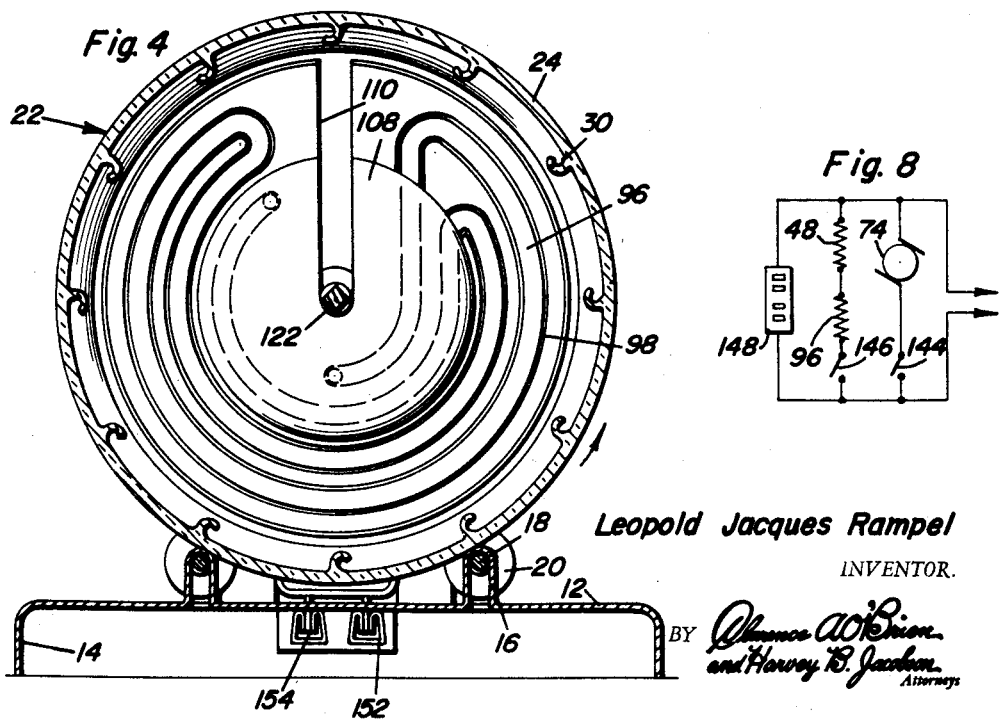
Leopold Jacques Rampel
INVENTOR.

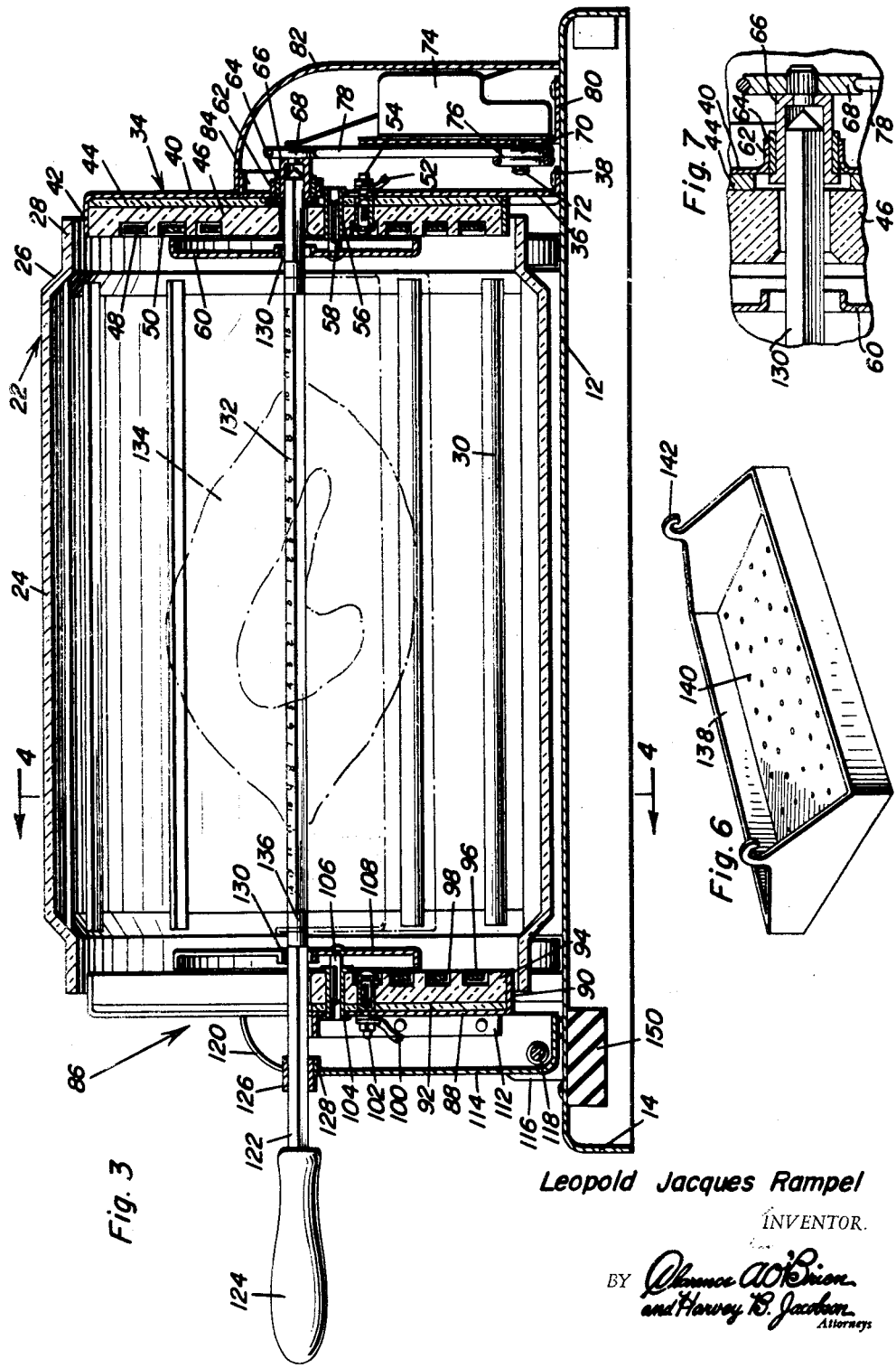

United States Patent Office 2,940,380
Patented June 14, 1960

2,940,380
ROTARY BROILER
Leopold Jacques Rampel, 511 N. 26th Ave., Hollywood, Fla.

Filed Jan. 22, 1959, Ser. No. 788,330

6 Claims. (Cl. 99—346)

The present invention generally relates to a broiler construction and more particularly to a rotary broiler which is self basting.

The primary object of the present invention is to provide a rotary broiler including a generally cylindrical drum disposed horizontally and rotatably about a horizontal axis in which the drum has an outwardly offset portion receiving basting material together with trough members movable with the drum which scoop up the basting material and subsequently spread the same over the article being cooked which is disposed centrally in the cylinder.

A further object of the present invention is to provide a rotary broiler incorporating heating elements disposed in the end walls with one of the end walls being pivotal to a retracted position for permitting access into the interior of the broiler and enabling the end wall to be employed for various heating purposes of general utility.

Yet another feature of the present invention is to provide a rotary broiler in which the article being broiled is disposed on a rod rotatably supported in the end walls and driven from one end thereof with the rod being removable from the cylindrical drum with the moving of the rod causing automatic disengagement between the rod and its driving power.

Yet another object of the present invention is to provide a rotary broiler having a novel cylindrical drum having a central area of a relatively large diameter and end areas of smaller diameters thus enabling the drum to be used while open at the end and allowing the same to be readily removable for ease of cleaning.

Briefly, the rotary broiler of the present invention includes two end mounted heating elements with one being rigidly attached to a drive housing and the opposite one being mounted on the hinge plate with the pivoting feature of the plate enabling the user to remove the loaded spit from the device. This will also enable the pivotal end plate to be used as an auxiliary burner for heating various material with there being provided a perforated pan hanging from the center of the spit which may be employed for holding small pieces of meat or vegetables for broiling.

Yet another feature of the present invention is to provide a rotary broiler which is simple in construction, easy to use, well adapted for its particular purposes and relatively inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the rotary broiler of the present invention;

Figure 2 is an end view from the drive end of the broiler;

Figure 3 is a longitudinal, vertical sectional view taken substantially upon a plane passing along section line 3—3 of Figure 2 illustrating the structural details of the broiler;

Figure 4 is a transverse sectional view taken substantially upon a plane passing along section line 4—4 of Figure 3 illustrating the construction of the pivotal end wall;

Figure 5 is a partial side elevation illustrating the pivotal end wall disposed in horizontal position such as would occur when using the end heating element as a burner;

Figure 6 is a perspective view of the perforated pan which may be hung from the spit and which may support small pieces of meat, vegetables, or the like for broiling;

Figure 7 is a detailed, fragmental sectional view illustrating the details of the supporting mechanism for the spit; and Figure 8 is a schematic wiring diagram.

Referring now specifically to the drawings, the numeral 10 generally designates the rotary broiler of the present invention which is supported from a generally rectangular base plate 12 having a depending peripheral edge 14. Upwardly extending elongated axle housings 16 are mounted on the base plate 12 and may be integral therewith in that they may be struck upwardly from the base plate 12 and the axle housings 16 receive a pair of longitudinally extending axles 18 each of which journals a pair of rollers 20 which rollers are arranged in transversely aligned pairs adjacent each end of the axles 18.

Rotatably supported by the rollers 20 is an elongated and enlarged cylindrical drum generally designated by the numeral 22 and including an elongated central area or main portion 24 of a major diameter having an inwardly offset portion 26 at each end thereof together with a longitudinally extending cylindrical flange 28 outwardly of each offset portion 26 which is of a minor diameter or lesser diameter than the major diameter of the main portion 24 of the drum 22. The cylindrical flange 28 rests on and engages the rollers 20 and the offset portion 26 positions the drum 22 on the rollers 20 so that the same cannot move longitudinally thereon. Also, the offset portion 26 provides a retaining means for grease or basting material disposed within the drum 22 thus enabling the drum 22 to have open ends with the offset portion 26 serving to both maintain the drum 22 on the rollers 20 and also maintain the grease, gravy or basting material within the drum 22 without any particular seal means being provided.

The interior surface of the cylindrical main portion 24 as well as a portion of the offset portion 26 is provided with a plurality of circumferentially spaced longitudinally extending trough shaped ribs 30 all of which face in the direction of rotation so that as the troughs 30 proceed through the liquid basing material in the bottom of the drum 22, a certain amount of the basting material will be picked up by each trough shaped rib 30 and subsequently be deposited over the article being cooked within the drum 22. For driving the drum 22, one of the axles 18 is provided with a drive pulley 32 on one end thereof which is associated with the drive mechanism as disclosed herein. Thus, the rollers 20 provide a frictional drive for the drum 22 which may be constructed of any suitable heat resisting material and preferably of glass or the like which is transparent thus enabling the cooking operation to be readily observed.

One end of the drum 22 is provided with a rigid end plate assembly generally designated by the numeral 34 which is supported from a bracket 36 attached to the base plate 12 as by fasteners 38. The bracket 36 is rigid and integral with an end plate 40 having an inturned cylindrical flange 42 disposed within the confines of the flange 28 but spaced circumferentially inwardly thereof thus eliminating any possible interference between the stationary cylindrical flange 42 and the rotatable cylindrical flange 28 on the drum 22. Insulating material 44 is disposed against the inner surface of the end plate 40 and an insulating member 46 is disposed within the confines of the flange 42 and is provided with a spiral heating element 48 disposed in a spiral groove 50 therein. The heating element 48 is connected to electrical conductors 52 by virtue of fastening bolts or connectors 54 with only one conductor 52 and bolt 54 being shown in Figure 3.

Disposed adjacent the center of the end member 34 but spaced therefrom is a cylindrical sleeve or bushing 56 which receives a slit spring pin 58 which supports a circular shield 60 in facing relation to the heating element 48 which covers the inner portion of the heating element in spaced relation thereto.

The end plate 40 is provided with a central aperture defined by a peripheral flange 62 which receives a bearing element 64 journaling a drive sleeve 66 herein which has a polygonal interior and which has an inner peripheral flange engaging the inner edge of the bearing 64 thus retaining the sleeve 66 in position since the inner edge of the flange on the inner end of the sleeve 66 will engage the bearing element 64. The outer closed end of the sleeve 66 is provided with a drive pulley 68 rigidly affixed thereto which drive pulley is in alignment with a drive pulley 70 on an electric motor and reduction gear output shaft 72 which is driven from an electric motor and reduction gear unit 74. A second drive pulley 76 is provided on the shaft 72 and this pulley is in alignment with the pulley 32 whereby the electric motor will drive both the sleeve 66 and the drum 22 by virtue of belt drives 78. The motor and reduction gear unit 74 is mounted on a suitable L-shaped bracket 80 attached to the base plate 12 and a hollow casing 82 is provided for enclosing the motor and drive unit with the casing having a generally arcuate surface attached to an arcuate flange 84 on the end plate 40. Thus, when the electric motor is energized, the drum 22 and the sleeve 66 will be rotated at a reduced rate of speed.

The other end of the drum 22 is closed by a pivotal end plate assembly generally designated by the numeral 86 which includes substantially the same structure as the end plate assembly 34 as to the end plate 88, flange 90, insulating material 92, insulating member 94, heating element 96 and groove 98. This end plate assembly is also provided with electrical conductors 100 attached to a fastening bolt 102 and is also provided with a cylindrical sleeve or bushing 104 for receiving a split spring pin 106 carried by a reflector plate 108. The end member 86 is provided with a vertically extending groove 110 which extends from the center thereof to the top edge and the groove 110 extends through the end plate 88, insulating member 92, insulating member 94 and, in effect, the heating element 96 which is reversely bent in the manner illustrated in Figure 4 to avoid passage over the groove 110.

The end plate 88 is provided with a mounting bracket 112 attached to a hollow pivotal bracket 114 supported between mounting lugs or brackets 116 carried by the base 12 by virtue of a hinge pin 118. The upper end of the pivotal bracket 114 is provided with a slot 120 in alignment with the slot 110 for receiving an elongated polygonal spit 122 which is provided with a handle 124 at one end thereof which may be constructed of wood or similar material. The portion of the polygonal spit 122 which is received in the bottom of the slot 120 is provided with a cylindrical bearing 126 for engagement with the bottom of the slot 120 which is defined by a flange 128.

The polygonal spit 122 extends throughout the length of the drum 22 and has a free end which may be pointed that is inserted into the rotatable sleeve 66 which has a polygonal interior for receiving the end of the spit 122. The spit 122 passes through openings 130 in the deflector plates 108 and 60 and is provided with numerical indicia 132 thereon having a central zero point with the numerical indicia and graduations extending outwardly from the center of the spit for orientating the piece of meat 134 to be cooked properly in the center of the drum 22.

The downward pivotal movement of the pivotal bracket 114 enables the removal of the spit 122 by supporting the weight thereof and pivoting the end member 86 downwardly after which the spit 122 may be withdrawn from the drum 22 by merely pulling the free end of the spit out of the bushing or sleeve 66. The reverse procedure is carried out when the spit 122 is reinserted into the drum 22. The spit 122 is also provided with spaced cylindrical portions 136 for hanging a shallow pan 138 thereon which pan has a bottom 140 that is perforated for supporting small articles to be cooked such as small pieces of meat, vegetables or the like. The end walls of the pan 130 are provided with hooks 142 which engage the cylindrical portions 136 thus forming a bearing area for hanging the pan 138 below the spit 122 with the perforated bottom 140 permitting the cooking grease, juices or the like to run down to the bottom of the drum 22 wherein the same may be subsequently picked up and discharged onto the articles being cooked.

The peripheral wall 14 of the base plate 12 may be provided with switches 144 and 146 for controlling the motor and the heating elements respectively and female socket assemblies 148 may be provided on the device for receiving electrical energy or for providing an outlet for other appliances.

Figure 5 illustrates the end plate 86 pivoted down to a horizontal position wherein a utensil such as a coffee pot may be supported thereon thus enabling the end member 86 to be used as a regular heater for heating or cooking any desired article.

Supported beneath the pivotal end plate 88 and below the base plate 12 is an insulating block 150 having a pair of spring contacts 152 therein which receive and engage a pair of projecting fingers 154 carried by the pivotal bracket 114 which completes a circuit to the heating element 96 and also forms a friction lock for frictionally retaining the end member 86 in vertical position. When the end member 86 is pivoted to a horizontal position, the same may be used for heating a coffee pot or any other similar utensil designated by the numeral 156 and illustrated in Figure 5.

While the dimensions of the device may vary, the diameter of the main cylindrical portion 24 of the drum 22 may be 10 inches in diameter while the cylindrical flange 28 may be 9 inches in diameter thus holding a large quantity of gravies, juices or fat and preventing the same from running out the end of the drum while in motion. The drum is easily removed for cleaning by merely lifting up the same and disconnecting the same from the rollers after the spit has been removed. The ribs or scoops 30 are approximately 15 inches long and the length of the flange 28 is approximately 1 inch. The removable heat reflectors prevent the extreme ends of the piece of meat being cooked from being exposed to direct heat at close range and the reflectors tend to reflect heat to the center of the cylinder within the contained space in the drum. The construction of the spit may vary and may include a series of smaller forks or prongs for holding small pieces of meat for cooking. While the drum has been stated as being constructed of glass approximately 10 inches in diameter and 17 inches long, it may be constructed from other material such as metal, plastics or the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A broiler construction comprising a base plate, a cylindrical drum disposed horizontally above said base plate, means mounted on said base plate and engaging the periphery of the drum for rotatably supporting the drum on the base plate, said drum having open ends with the end portions having a diameter less than the central area for retaining liquids within the central area of the drum, end members disposed in the open ends of the drum, a spit supported from the end members and disposed centrally of the drum for holding an article to be cooked, and means on the inner surface of said drum for discharging liquid material onto the article being cooked during rotation of the drum, each of said end members including a heating element for heating the article to be cooked supported on the spit, one of said end members having drive means associated therewith for driving the spit about its longitudinal axis and also for rotating the drum.

2. The structure as defined in claim 1 wherein said means on the base for engaging the drum includes a plurality of pairs of longitudinally spaced rollers with the rollers in each pair being transversely spaced and aligned.

3. The structure as defined in claim 1 wherein said means on the inner surface of the drum for discharging liquid onto the article being cooked includes a plurality of trough shaped ribs all opening in the same direction with the open portion of the trough shaped ribs facing laterally of a radius of the drum passing through the respective ribs for scooping up liquid and discharging the same onto the article being cooked.

4. The structure as defined in claim 1 wherein the other of said end members is pivotally supported and is provided with a slot for permitting removal of and insertion of the spit and access to the interior of the drum.

5. The structure as defined in claim 1 wherein said spit is polygonal and is engaged with a polygonal sleeve driven from said drive means, said spit having graduations and indicia thereon for indicating the positioning of the meat on the spit.

6. The combination of claim 1 wherein said spit is provided with cylindrical portions, and a perforated pan suspended from the cylindrical portions and journaled thereon for holding small pieces of food to be cooked.

References Cited in the file of this patent

UNITED STATES PATENTS

| | | |
|---|---|---|
| 2,004,775 | Wright | June 11, 1935 |
| 2,041,318 | Berger | May 19, 1936 |
| 2,257,580 | Trompeter | Sept. 30, 1941 |
| 2,448,215 | George | Aug. 31, 1948 |
| 2,705,450 | Steinbook | Apr. 5, 1955 |
| 2,783,548 | Halldorsson | Mar. 5, 1957 |

FOREIGN PATENTS

| | | |
|---|---|---|
| 44,657 | Austria | Oct. 25, 1910 |